United States Patent Office 3,280,123
Patented Oct. 18, 1966

3,280,123
POTASSIUM DICHLOROISOCYANURATE COMPOSITIONS AND PROCESSES FOR PREPARING SAME
William F. Symes, St. Louis, Mo., assignor to Monsanto Company, a corporation of Delaware
No Drawing. Filed Nov. 16, 1964, Ser. No. 411,542
7 Claims. (Cl. 260—248)

This application is a continuation-in-part of U.S. patent application, Serial Number 49,462, filed August 15, 1960, now abandoned.

The present invention relates to potassium dichloroisocyanurate and particularly relates to novel physically stable, dry, free flowing potassium dichloroisocyanurate compositions. The present invention further relates to novel compositions containing potassium dichloroisocyanurate as the major ingredient, which compositions are physically stable in that they will not coalesce or develop hard lumps to any appreciable extent. The present invention also relates to novel physically stable potassium dichloroisocyanurate compositions which contain substantially the same amount of available chlorine as potassium dichloroisocyanurate per se, and to processes for preparing these compositions. The term "physically stable" as used herein defines compositions which are free flowing and which do not tend to coalesce or form lumps under ordinary storage conditions for prolonged periods.

It has been proposed heretofore, in various patents of which I have knowledge, to prepare potassium dichloroisocyanurate by a variety of procedures. For example, in one of these patents, it is disclosed that potassium dichloroisocyanurate may be prepared by directly chlorinating an aqueous solution of tripotassium cyanurate with gaseous chlorine wherein the gaseous chlorine is introduced into the tripotassium cyanurate solution (the solution being agitated to permit diffusion of the chlorine) at a rate sufficient to maintain a pH in the range of 6.0 to 8.5, thereby forming a slurry of potassium dichloroisocyanurate in the aqueous bulk of the reaction mixture which can be readily separated therefrom. Such procedure is described in greater detail in U.S. Patent 3,035,056 which is assigned to the same assignee as the present application. In still another patent, it is disclosed that potassium dichloroisocyanurate may also be prepared, for example, by reacting two molecular proportions of trichloroisocyanuric acid and one molecular proportion of tripotassium cyanurate in an aqueous medium wherein the potassium dichloroisocyanurate again forms as a slurry in the aqueous bulk of the reaction mixture. The preparation of potassium dichloroisocyanurate by this method is described in U.S. Patent 3,035,057 which is also assigned to the same assignee as the present application.

Potassium dichloroisocyanurate, prepared as described in the preceding paragraph, may occur in any of three crystalline forms or mixtures thereof, depending on the temperature of the aqueous medium at the time the potassium dichloroisocyanurate is formed as a slurry in either or both of the above-described aqueous reaction mixtures. Generally, if such temperature is below about 52° C., crystalline potassium dichloroisocyanurate monohydrate is formed and if such temperature is above about 56° C., anhydrous crystalline potassium dichloroisocyanurate (hereinafter sometimes referred to, for convenience in description, as Form I potassium dichloroisocyanurate) is formed. On the other hand, where the temperature of the aqueous reaction medium is in the range of about 52° C. to about 56° C. a mixture of potassium dichloroisocyanurate monohydrate and anhydrous Form I potassium dichloroisocyanurate is formed.

The crystals of potassium dichloroisocyanurate monohydrate are characterized in having internal and external symmetries each of which are triclinic while the crystals of anhydrous Form I potassium dichloroisocyanurate have internal and external symmetries each of which are monoclinic. However, it has been observed heretofore that potassium dichloroisocyanurate monohydrate will readily give up its water of hydration when heated at a temperature between about 100° C. and about 150° C. and that the product which results from such procedure is a pseudomorphic, crystalline, anhydrous potasium dichloroisocyanurate wherein the crystals have an internal symmetry which is monoclinic and an external symmetry which is triclinic. Stated differently, crystals of the dehydrated monohydrate retain the triclinic external symmetry of potassium dichloroisocyanurate monohydrate but during and after dehydration assume the monoclinic internal symmetry of the potassium dichloroisocyanurate which is originally formed in the anhydrous state. (The anhydrous potassium dichloroisocyanurate obtained from potassium dichloroisocyanurate monohydrate which has been dehydrated will be hereinafter referred to as pseudomorphic potassium dichloroisocyanurate and sometimes referred to hereinafter, for convenience in description, as Form II potassium dichloroisocyanurate.)

Although potassium dichloroisocyanurate can be produced as the monohydrate, neither the Form I nor pseudomorphic or Form II potassium dichloroisocyanurate can be easily transformed into the monohydrate by exposure to surface moisture. During production, commercial potassium dichloroisocyanurate is almost always dried as either the Form I or the dehydrated pseudomorphic crystalline form as a final step in the manufacturing process. Such commercial potassium dichloroisocyanurate has certain distinct advantages over other chloroisocyanurate compounds, one of the more important being its relatively good stability to loss of available chlorine during shipping and storage, and when incorporated in commercial detergent, bleaching, sanitizing and other formulations.

While either Form I or Form II potassium dichloroisocyanurate is suitable for incorporation in a wide variety of formulations, for example, in household laundry bleaches and detergents, hospital disinfectants, sterilizing compositions and the like, a high percentage of the dried and anhydrous or substantially anhydrous material as produced, coalesces and forms hard lumps or "solid cakes" in storage in metal and other containers under prolonged storage conditions of more than two months. In many instances the lumped or caked material can be removed only with difficulty from the containers and it is often necessary to reprocess it by heating and/or grinding the coalesced potassium dichloroisocyanurate before it can be incorporated in the above-mentioned formulations. Such reprocessing involves considerable cost, which cost is increased due to loss of some of the caked potassium dichloroisocyanurate which cannot be removed from the containers.

The solution to this particular caking problem has not been recognized by the prior art. It is known that dichlorocyanuric acid has been added, in relatively large quantities, to potassium dichlorocyanurate to stabilize the latter against thermal decomposition, i.e. self-sustaining, thermally-initiated decomposition. While the utilization of said acid admixed with the potassium dichlorocyanurate may inherently provide some anti-caking properties during short term storage, it has now been unexpectedly discovered that the sodium salt of this acid, i.e. sodium dichloroisocyanurate, has far superior anti-caking qualities than the acid per se. It has also been unexpectedly found that the sodium salt can be used in lesser quantities than the acid for admixing with the potassium dichloroisocyanurate.

It is one object of the present invention to provide a dry, free-flowing novel product comprising substantially potassium dichloroisocyanurate which product is not only suitable for a variety of uses as in the case of potassium dichloroisocyanurate per se, but is also physically stable for long periods of time.

It is a further object of the present invention to provide novel dry, free-flowing potassium dichloroisocyanurate compositions containing anhydrous crystalline sodium dichloroisocyanurate which compositions are not only suitable for a variety of uses but which may be stored for periods of at least six months without appreciable coalescence or lump formation.

It is a still further object of the present invention to provide novel, dry, free-flowing potassium dichloroisocyanurate compositions containing anhydrous, hydratable, crystalline sodium dichloroisocyanurate which compositions are not only suitable for a variety of uses but will not appreciably coalesce or form lumps for periods of at least six months and which contain substantially the same percentage of available chlorine as potassium dichloroisocyanurate per se.

It is also an object of the present invention to provide novel processes for preparing the aforementioned compositions.

Other objects and advantages of this invention will become apparent from the following description and the appended claims.

It has presently been found that the incorporation, in relatively small amounts, of partially to completely anhydrous water soluble, non-deliquescent, hydratable, crystalline sodium dichloroisocyanurate having a rate of hydration greater than 160 milligrams percent (that is, milligrams per 100 grams) per hour at a temperature of 25° C. and a relative humidity of 100%, in substantially anhydrous Form I, Form II potassium dichloroisocyanurate and mixtures thereof will provide a free flowing potassium dichloroisocyanurate product, far superior to the acid mixture thereof, which will not coalesce or form hard lumps to any appreciable extent even when stored for long periods of time, for example, from 2 to 18 months under conditions of high average ambient relative humidity, such as for example, an average ambient relative humidity of from 60% to 80%. The rate of hydration of the hydratable crystalline sodium dichloroisocyanurate of this invention is such that a 100-gram proportion of such crystalline compound, having a certain range of crystalline size (hereinafter defined) will hydrate in the form of crystalline water of hydration to the extent of 160 milligrams in 1 hour under the aforedescribed temperature and humidity conditions.

In determining whether or not an anhydrous hydratable, water soluble, non-deliquescent crystalline sodium dichloroisocyanurate is suitable for incorporation in a potassium dichloroisocyanurate in accordance with the practice of this invention, a 50- to 100-gram portion of such sodium dichloroisocyanurate is usually standardized with respect to crystalline size and then spread out as a 1/8 inch thick layer in a flat container which is placed in a chamber having a temperature of 25° C. and a relative humidity of 100% where an aliquot of the compound is generally weighed at 15-minute intervals for a period of 5 hours to ascertain the rate of hydration of such compound.

The sodium dichloroisocyanurate, having a standardized crystalline size, is usually obtained by passing the crystalline material successively through a No. 100 and a No. 200 standard mesh U.S. Screen and thereafter using the material which is retained on the No. 200 mesh screen in determining the rate of hydration of the compound. The rate of hydration is usually determined by adding the gains in weight, which total gain is generally at a constant rate for a period of more than 5 hours, over any of 4 consecutive 15-minute periods.

The crystalline sodium dichloroisocyanurate utilized in the present invention is thoroughly and intimately admixed with the substantially anhydrous Form I or Form II potassium dichloroisocyanurate by any suitable mechanical mixing device, such as for example, a bladed folding mixer such as a "Reed" mixer used in the baking industry, to insure a complete and intimate admixture. It is desirable that the size of the crystals of the crystalline sodium dichloroisocyanurate be similar to the size of the crystals of the potassium dichloroisocyanurate into which the compound will be incorporated. The crystal size can vary considerably but is preferably such that between 70% and 80% by weight of each material (and also the resulting potassium dichloroisocyanurate composition) is retained on a No. 325 mesh standard U.S. Screen and less than 10%, preferably less than 5% by weight is retained on a No. 10 mesh standard U.S. Screen.

The crystalline sodium dichloroisocyanurate material which is used is a compound which also will not react, that is will not undergo an oxidation-reduction reaction with potassium dichloroisocyanurate when intimately admixed therewith.

In all essential respects the physical, chemical, and functional properties of the potassium dichloroisocyanurate (as freshly prepared) are not affected by the incorporation therein of the crystalline sodium dichloroisocyanurate material in small amounts. By contrast, anhydrous Form I or Form II potassium dichloroisocyanurate which do not contain the above-mentioned crystalline sodium dichloroisocyanurate of this invention will, in most instances, coalesce and develop hard lumps or will cake under identical storage conditions, and when such a condition occurs the potassium dichloroisocyanurate is unsuitable for most commercial end uses unless it is reprocessed or comminuted.

By the same token, when dichloroisocyanuric acid is admixed with the Form I or Form II potassium dichloroisocyanurate, the resulting mixture will exercise a degree of stability for a minimum of two months. However, when sodium dichloroisocyanurate is admixed (in small amounts) with potassium dichloroisocyanurate, the resulting mixture has a minimum degree of stability of six months.

The crystalline sodium dichloroisocyanurate should be incorporated in freshly prepared, dry potassium dichloroisocyanurate in an amount sufficient to prevent coalescence or lumping, during prolonged storage periods of at least two months but the amount used should not cause appreciable change in the characteristics and properties of the potassium dichloroisocyanurate, particularly with respect to lessening the water solubility and substantially decreasing the available chlorine content of the potassium dichloroisocyanurate. It has presently been found that from about 0.5% to about 10.0% by weight of the crystalline sodium dichloroisocyanurate can be intimately admixed with potassium dichloroisocyanurate to prevent the above-mentioned coalescence.

The amount of the partially to completely anhydrous crystalline sodium dichloroisocyanurate added to the compositions of this invention will also depend upon the amount of water (as water of hydration) which may be present in such compound and the amount of residual moisture which may be present in the dried, freshly prepared potassium dichloroisocyanurate. Usually, the moisture content (as water of hydration) of the crystalline sodium dichloroisocyanurate should not exceed 0.5% by weight. The dry potassium dichloroisocyanurate should contain not more than 0.3%, preferably not more than 0.2% by weight of residual moisture. When the potassium dichloroisocyanurate and the sodium dichloroisocyanurate are both substantially bone dry, a smaller amount of the latter material is required to prevent coalescence or lump formation when the potassium dichloroisocyanurate is subjected to storage conditions for periods longer than six months.

The particular compound which is used in the practice of this invention is partially to completely anhydrous sodium dichloroisocyanurate having the afore-defined crystalline particle size and containing not more than 0.5% by weight of moisture as water of hydration. The addition of from about 0.5% to about 10%, preferably from about 0.5 to 5%, more particularly from about 2% to 5%, by weight of such sodium dichloroisocyanurate to a potassium dichloroisocyanurate containing not more than 0.3% by weight of moisture provides a potassium dichloroisoyanurate composition which contains substantially the same amount of available chlorine as potassium dichloroisocyanurate per se, but which will remain free flowing and will not coalesce or form lumps for from 2 to 18 months under storage conditions which are normally encountered in commercial operations. On the other hand, addition of correspondingly small amounts of dichloroisocyanuric acid to potassium dichloroisocyanurate will result in a composition which will remain free flowing and will not coalesce or form lumps for about only two months under storage conditions which are normally encountered in commercial operations.

The stabilized potassium dichloroisocyanurate compositions of this invention are characterized in having an available chlorine content of about 58% to about 61%, in contrast to 60.08% available chlorine which is the theoretical available chlorine content of Form I or Form II potassium dichloroisocyanurate per se. The stabilized potassium dichloroisocyanurate compositions are further characterized in that they are uniform crystalline products. When such compositions are subjected to particle size measurement by standard screen analysis in one embodiment of this invention, usually less than 10%, preferably less than 5% by weight is retainable on a No. 40 mesh standard U.S. Screen and between 70% and 80%, preferably 80% by weight is retainable on a No. 325 mesh standard U.S. Screen.

Although the potassium dichloroisocyanurate compositions of the present invention can be prepared by intimately admixing the ingredients under ambient temperature conditions, such compositions are preferably and more advantageously prepared by a novel process which comprises heating any crystalline form of moisture containing potassium dichloroisocyanurate to a temperature in the range of 100° C. to 150° C., preferably to a temperature in the range of 110° C. to 130° C. until the potassium dichloroisocyanurate contains less than 0.3% by weight of moisture. Thereafter while the potassium dichloroisocyanurate is at such temperature, the hydratable, water soluble, non-deliquescent crystalline sodium dichloroisocyanurate may be intimately admixed with the potassium dichloroisocyanurate to form dry free flowing compositions which will not coalesce or form lumps even when stored for long periods of time, for example, periods of 6 to 18 months under conditions of high ambient relative humidity.

It has unexpectedly been found that when potassium dichloroisocyanurate compositions are prepared by the above-described process, such compositions not only remain dry and free flowing when stored for prolonged periods of time but are also somewhat more stable toward loss of available chlorine than potassium dichloroisocyanurate which has coalesced or formed hard lumps. Thus, the compositions of this invention are stable for a minimum of two months when they are prepared under ambient conditions. However, such compositions when prepared by the aforedescribed process generally are physically stable for a minimum of 10 months when stored under humid conditions as above-described.

It has also unexpectedly been found that substantially smaller amounts of the crystalline sodium dichloroisocyanurate compound of the present invention are required when the aforedescribed process is practiced. Thus, for example, as little as 0.5% of sodium dichloroisocyanurate may be added to potassium dichloroiscyoanurate to form physically stable compositions which will not coalesce, which contain substantially the same amount of available chlorine as potassium dichloroisocyanurate and which are more stable towards loss of available chlorine than potassium dichloroisocyanurate which has coalesced or formed lumps.

One of the unexpected aspects of the present invention consists in the discovery that only crystalline sodium dichlorisocyanurate which is water soluble, hydratable and which has a rate of hydration greater than 160 milligrams percent per hour will, when incorporated in the potassium dichloroisocyanurates of this invention, provide compositions which are free flowing and which will not coalesce or form lumps for prolonged periods of time under commercial storage conditions. On the other hand, materials which are not hydratable but which are often used to prevent lump formation in solid particulate materials such as, for example, materials which do not form hydrates or materials which have a rate of hydration slower than 160 milligrams percent per hour are ineffective in preventing coalescence and lump formation in potassium dichloroisocyanurates when incorporated therein in amounts of from 10% to 15% by weight. Also, crystalline compounds which have a rate of hydration greater than 160 milligrams percent per hour but which are deliquescent, that is, continue to absorb moisture after becoming completely hydrated, have also been found ineffective in preventing coalescence and lumping of potassium dichloroisocyanurate under storage conditions when incorporated therein. Water insoluble organic materials have also been found ineffective in preventing coalescence and are also unsuited as formulation components in laundering and dishwashing compositions.

A further understanding of the compositions and processes of this invention will be obtained from the following specific examples which are intended to illustrate the invention but not to limit the scope thereof; parts and percentages are by weight unless otherwise specified.

*Example 1*

A commercial potassium dichloroisocyanurate was examined and found to be substantially Form II potassium dichloroisocyanurate having an available chlorine content of 59.6% and containing 0.2% moisture.

A screen analysis of this product exhibited the following crystal size distribution:

Standard screen No.:     Material retained (percent)
+40 _____ 7.8
−40 +60 _____ 17.8
−60 +100 _____ 18.9
−100 +200 _____ 25.2
−200 +325 [1] _____ 8.2

[1] 22.1% of the material passed through the 325 mesh screen.

Using the above product, two potassium dichloroisocyanurate compositions were prepared wherein the materials used, as well as the resultant formulations had a crystalline size range comparable and similar to the crystalline size range of the potassium dichloroisocyanurate. All materials also had a moisture content below 0.5% by weight. The formulae of these compositions and their available chlorine content are summarized as follows:

POTASSIUM DICHLOROISOCYANURATE COMPOSITIONS

| Composition Number | 1 | 2 | 3 [1] |
|---|---|---|---|
| Material: | Percent | Percent | Percent |
| Potassium dichloroisocyanurate | 99.0 | 95.0 | 100 |
| Sodium dichloroisocyanurate | 1.0 | | |
| Dichloroisocyanuric acid | | 5.0 | |
| Available chlorine analysis | 59.6 | 59.6 | 59.6 |

[1] Control.

Each composition was mechanically mixed in a Reed baking mixer at room temperature for two hours. The above compositions were then stored in ordinary closed metal containers in a regular storeroom under ambient conditions wherein the temperature varied between 60° F. and 90° F. and the relative humidity between 50% and 85% and were examined weekly for evidence of coalescence and lump formation as well as moisture and available chlorine content for over a period of 36 weeks. After this period, compositions 1 and 2 appeared as dry, free flowing products and showed no evidence of coalescence, lumping or caking. Composition 2 showed evidence of lumping after 36 weeks and large size lumps were found throughout the sample. On the other hand potassium dichloroisocyanurate per se (composition No. 3) exhibited some lumping within three weeks and at the end of two months had coalesced into a hard mass.

Data concerning available chlorine and moisture content of each of compositions 1 through 3 as recorded initially and at the end of 36 weeks is summarized as follows:

| Composition Number | Initial | | After storage (36 weeks) | |
|---|---|---|---|---|
| | Available Chlorine, Percent | Moisture, Percent | Available Chlorine, Percent | Moisture, Percent |
| 1 | 59.6 | 0.2 | 59.1 | [1] 0.3 |
| 2 | 59.6 | 0.3 | 59.2 | [2] 0.5 |
| 3 | 59.6 | 0.2 | 58.0 | [3] 0.3 |

[1] Composition free flowing.
[2] Composition had numerous lumps after 36 weeks.
[3] Composition had coalesced into a solid cake.

A screen analysis of compositions 1 and 2 showed that the range in crystalline size of these compositions remained unchanged after storage for 36 weeks. A screen analysis of composition 3 (100% potassium dichloroisocyanurate) could not be made since the material had coalesced into a single mass which could only be broken with difficulty.

*Example II*

The procedures and compositions described in Example I were repeated except that just prior to and during the addition of the ingredients to each composition the Form II potassium dichloroisocyanurate was heated at a temperature of 115° C. Heat was withdrawn in each instance as the potassium dichloroisocyanurate was placed in the Reed mixer along with the particular additive. The mixture was slowly permitted to return to room temperature (e.g. 25° C.) during the two-hour mixing period. The formulae and the available chlorine content of these compositions are summarized as follows:

POTASSIUM DICHLOROISOCYANURATE COMPOSITIONS

| Composition Number | 1 | 2 | 3 [1] |
|---|---|---|---|
| Material: | Percent | Percent | Percent |
| Potassium dichloroisocyanurate | 99.5 | 95.0 | 100 |
| Sodium dichloroisocyanurate | 0.5 | | |
| Dichloroisocyanuric acid | | 5.0 | |
| Available chlorine (by analysis) | 60.1 | 60.6 | 60.1 |

[1] Control.

Each composition was mechanically mixed in a Reed mixer for two hours. The temperature of the composition at the start of such operation was about 115° C. but the composition slowly adjusted to room temperature during the two-hour mixing period.

The above compositions were stored under the conditions described in Example I and were examined weekly for evidence of coalescence and available chlorine content over a 40-week period. After this period, compositions 1 and 2 appeared as dry, free flowing products and showed no evidence of coalescence or lump formation. Composition 2 showed evidence of lumping after 40 weeks and numerous large size lumps were found throughout the sample. On the other hand composition No. 3 (potassium dichloroisocyanurate per se) exhibited some lumping within three weeks and at the end of four months had coalesced into a hard mass.

Data concerning the available chlorine and moisture content of each of compositions 1 through 3 as recorded initially and at the end of 40 weeks is summarized as follows:

| Composition Number | Initial | | After storage (40 weeks) | |
|---|---|---|---|---|
| | Available Chlorine, percent | Moisture, percent | Available Chlorine, percent | Moisture, percent |
| 1 | 60.1 | 0.1 | 60.0 | [1] 0.3 |
| 2 | 60.6 | 0.2 | 59.9 | [2] 0.4 |
| 3 | 60.1 | 0.1 | 59.1 | [3] 0.3 |

[1] Composition was free flowing.
[2] Composition had numerous lumps after 40 weeks.
[3] Composition had coalesced into a solid cake.

A screen analysis of compositions 1 and 2 showed that the range in crystalline size of these compositions remained unchanged after 40 weeks. A screen analysis of composition 3 could not be made due to extensive coalescence therein.

When the hydratable, water insoluble compounds, calcium sulfate and magnesium silicate were admixed with heated potassium dichloroisocyanurate as in Example 2 above, the resulting products, when stored and examined as aforedescribed, developed hard lumps which were broken only with difficulty. Such compositions were caked along the walls of the container after two months of storage and were quite similar in appearance to the potassium dichloroisocyanurate of composition No. 3 which was examined simultaneously with these compositions.

Non-hydratable, water insoluble materials such as talc and precipitated silica (Cabo-Sil) were admixed with heated potassium dichloroisocyanurate as in Example II and the resulting products stored and evaluated as in Example II. After two months of such storage these products had developed hard lumps and had coalesced along the sides of the containers in which they were stored. Materials such as talc and Cabo-Sil are commonly used to prevent caking and lump formation in granular crystalline materials but such materials were ineffectual in preventing coalescence and lump formation in potassium dichloroisocyanurate.

*Example III*

Further comparative test data were obtained by two separate methods, i.e., visual observation and conductivity measurement. (A) The *visual observation test* comprised preparing samples of potassium dichloroisocyanurate; admixing separately therewith various amounts of sodium dichloroisocyanurate and dichloroisocyanuric acid; tapping the mixture thirty times on a tabletop; heating the mixtures in an oven at 125° C. for twenty (20) minutes; setting the samples out to cool overnight; examining the mixtures by inverting the sample bottle and then shaking to try to break any lumps after the mass had fallen.

(B) The *conductivity measurement test* comprised the taking of conductivity values of similar mixtures prepared in the aforementioned test A. The results of tests A and B are set forth in Tables I and II, respectively.

The results of tests A and B show in each case the superiority of sodium dichloroisocyanurate over dichloroisocyanuric acid as an anti-caking agent for potassium dichloroisocyanurate.

Another aspect of this invention which was discovered during the testing of sodium dichloroisocyanurate and dichloroisocyanuric acid, is that the acid decreased the solubility of the potassium dichloroisocyanurate while the sodium salt of said acid produced a slight increase in the solubility of the end product. In view of the intended utilization of the end product, i.e., the potassium dichloroisocyanurate composition, an increase in solubility is highly desirable while a decrease in solubility is definitely detrimental.

TABLE I

| Potassium dichloroisocyanurate | | Sodium dichloroisocyanurate, weight percent | Dichloroisocyanuric acid, weight percent | Visual observation |
|---|---|---|---|---|
| Weight percent | Percent water | | | Remarks |
| 99 | 0.05 | 1 | 0 | Free flowing. |
| 99 | 0.05 | 0 | 1 | One lump after shaking. |
| 99 | 0.10 | 1 | 0 | Several lumps after shaking. |
| 99 | 0.10 | 0 | 1 | Lumps after shaking. |
| 98 | 0.10 | 2 | 0 | Free flowing. |
| 98 | 0.10 | 0 | 2 | Lumpy after shaking. |
| 98 | 0.15 | 2 | 0 | Do. |
| 98 | 0.15 | 0 | 2 | Big lumps after shaking. |
| 97 | 0.10 | 3 | 0 | Free flowing. |
| 97 | 0.10 | 0 | 3 | Big lumps after shaking. |
| 97 | 0.15 | 3 | 0 | One main lump after shaking. |
| 97 | 0.15 | 0 | 3 | Big lump after shaking. |
| 97 | 0.20 | 3 | 0 | 3-4 lumps after shaking. |
| 97 | 0.20 | 0 | 3 | Big lumps. |

TABLE II

| Potassium dichloroisocyanurate | | Sodium dichloroisocyanurate, weight percent | Dichloroisocyanuric acid, weight percent | Conductivity Number (<25= free flowing) | Remarks |
|---|---|---|---|---|---|
| Weight percent | Percent water | | | | |
| 99 | 0.05 | 1 | 0 | 20.9 | Free flowing. |
| 99 | 0.05 | 0 | 1 | 31.2 | Flowing difficult. |
| 98 | 0.15 | 2 | 0 | 21.2 | Free flowing. |
| 98 | 0.15 | 0 | 2 | 45.0 | Hard cake. |
| 97 | 0.10 | 3 | 0 | 21.7 | Free flowing. |
| 97 | 0.10 | 0 | 3 | 38.1 | Mat lump. |

| Screen Analysis U.S. Standard Mesh No. | | | | |
|---|---|---|---|---|
| 20 | 0.2 | | | |
| 40 | 2.9 | 0.8 | | |
| 60 | 9.6 | 1.9 | | |
| 100 | 12.3 | 3.5 | | |
| 200 | 37.5 | 23.0 | | |
| 325 | 13.8 | 58.3 | | |
| Pan | 23.7 | 12.5 | | |

Further, it has been ascertained that the rate of solution in water of a mixture of dichloroisocyanuric acid and potassium dichloroisocyanurate is eight times slower than that of potassium dichloroisocyanurate per se. More specifically, the rate of solution of 1 gram of potassium dichloroisocyanurate in 100 grams of water was 5 seconds, and the resultant solution had a pH of 6.6; whereas the rate of solution of a mixture of 0.95 gram of potassium dichloroisocyanurate plus 0.05 gram of dichloroisocyanuric acid in water was 40 seconds and the resultant solution had a pH of 5.1. The rate of solution, however, of a mixture of potassium dichloroisocyanurate and sodium dichloroisocyanurate is at least equivalent to that of the potassium dichloroisocyanurate per se. This aspect of the invention further demonstrates the superiority of the sodium salt of the acid over the acid in combination with potassium dichloroisocyanurate. In consideration of the intended uses of these potassium dichloroisocyanurate compositions, it is readily seen that an increase, by a factor of 8, of the time required to dissolve the compositions in water when dichloroisocyanuric acid is used in the mixture, is a highly undesirable feature.

What is claimed is:

1. A dry, stable, free-flowing potassium dichloroisocyanurate composition having an available chlorine content of from about 58% to about 61% and which does not appreciably coalesce or lump during storage consisting essentially of particles of crystalline potassium dichloroisocyanurate having an internal monoclinic symmetry and an external triclinic symmetry, said particles having a particle size in the range wherein less than 10% by weight of the particles are retained on a No. 10 U.S. Standard screen and between 70% and 80% of the particles are retained on a No. 325 mesh U.S. Standard screen, said particles being further characterized by being the resultant product obtained by heating crystalline potassium dichloroisocyanurate particles having said symmetry characteristics to a temperature of from about 100° C. to about 150° C. until said particles contain less than 0.3% by weight of moisture and then mixing therewith from about 2.0% to about 5% of particles of a partially to completely anhydrous, hydratable, crystalline sodium dichloroisocyanurate having a rate of hydration greater than 160 milligrams percent per hour at a temperature of 25° C. and a relative humidity of 100%, said sodium dichloroisocyanurate particles having particle sizes within the range specified for said potassium dichloroisocyanurate particles and containing less than 0.5% by weight of water.

2. A process for making potassium dichloroisocyanurate particles which do not appreciably coalesce or lump during storage which consists essentially of intimately admixing solid particles of potassium dichloroisocyanurate containing less than 0.3% by weight of moisture, with from about 0.5% to about 5% by weight, based on the weight of said potassium dichloroisocyanurate, of solid particles of partially to completely anhydrous, hydratable, crystalline sodium dichloroisocyanurate which contains less than 0.5% by weight of moisture until a dry, stable free-flowing potassium dichloroisocyanurate product is formed.

3. The process as set forth in claim 2 and further including the step of heating the solid particles of potassium dichloroisocyanurate, prior to admixing, to a sufficient temperature whereby the amount of sodium dichlorisocyanurate added thereto is reduced and the properties of said product are not adversely affected.

4. The process as set forth in claim 2 and further including the step of heating the solid particles of potassium dichloroisocyanurate, prior to admixing, to a temperature in the range of 100° C. to about 150° C.

5. A process for making potassium dichloroisocyanurate particles which do not appreciably lump or coalesce during storage which consists essentially of intimately admixing solid particles of potassium dichloroisocyanurate having an internal monoclinic symmetry and an external triclinic symmetry, a particle size such that about 10% by weight of the particles are retained on a No. 10 mesh standard U.S. Screen and between about 70% to about 80% by weight of moisture, with from about 0.5% to 5% by weight of particles of sodium dichloroisocyanurate containing less than 0.5% by weight of moisture as water of hydration and having a particle size within the range of said particles of potassium dichloroisocyanurate until a dry, stable, free-flowing potassium dichloroisocyanurate product is formed.

6. The process as set forth in claim 5 and further including the step of heating the solid particles of potassium dichloroisocyanurate, prior to admixing, to a sufficient temperature whereby the amount of sodium dichloroisocyanurate added thereto is reduced and the properties of said product are not adversely affected.

7. The process as set forth in claim 5 and further including the step of heating the solid particles of potassium dichloroisocyanurate, prior to admixing, to a temperature in the range of 100° C. to about 150° C.

References Cited by the Examiner
UNITED STATES PATENTS

| | | | |
|---|---|---|---|
| 2,913,460 | 11/1959 | Brown et al. | 260—248 |
| 3,035,054 | 5/1962 | Symes et al. | 260—248 |
| 3,035,057 | 5/1962 | Symes et al. | 260—248 |
| 3,145,206 | 8/1964 | Fuchs et al. | 260—248 |

WALTER A. MODANCE, *Primary Examiner.*

JOHN M. FORD, *Assistant Examiner.*